Jan. 20, 1970 KENJI ARIYASU ET AL 3,490,348

FILM MAGAZINE

Filed June 14, 1967

INVENTORS
KENJI ARIYASU
MOTOYOSHI FURUSAWA

BY Sughrue, Rothwell, Mion, Zinn, & Macpeak

ATTORNEYS

United States Patent Office 3,490,348
Patented Jan. 20, 1970

3,490,348
FILM MAGAZINE
Kenji Ariyasu, Minami-Ashigara-machi, and Motoyoshi Furusawa, Omiya-shi, Japan, assignors to Fuji Shashin Film Kabushiki Kaisha, Minami-Ashigara-machi, and Fuji Photo Optical Company, Omiya-shi, Japan
Filed June 14, 1967, Ser. No. 645,974
Claims priority, application Japan, June 16, 1966, 41/56,919
Int. Cl. G03b *19/04*
U.S. Cl. 95—31        2 Claims

ABSTRACT OF THE DISCLOSURE

A film magazine has a cylindrical body, a pair of side walls and a slot through which the film is withdrawn. A spool shaft is rotatably mounted within the magazine and openings in the side walls provide access to it. One side wall has an arcuate projection concentric with the cylindrical body and spool shaft opening. The difference between the radius of the cylindrical body and the radius of the arcuate projection is representative of a predetermined characteristic of the film.

BACKGROUND OF THE INVENTION

This invention relates to improvements in film magazines.

The conventional film magazine for still cameras is composed of film housing with a cylindrical body portion and a spool shaft rotatably mounted therein, and the end of the spool shaft projects out from the side wall of the body portion. The projected portion of the spool shaft has no special effect on the camera. To accommodate the projected portion the camera is manufactured unnecessarily large.

SUMMARY OF THE INVENTION

The film magazine of this invention is for still cameras of compact size having means for auto-setting for film sensitivity but which can be used in all 35 mm. still cameras in which the conventionally employed film magazine is used.

This invention provides a film magazine having a side wall projection or recess positioned to set the exposure control means in a camera according to the film sensitivity of the film in the magazine. Another feature of this invention is that the film magazine is of shorter length than the conventional ones so that more compact cameras can be manufactured.

DESCRIPTION OF THE PREFERRED EMBODIMENTS

Figure 1:
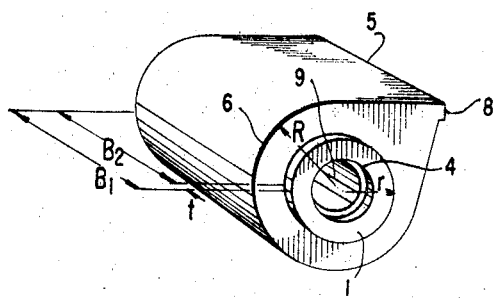
FIGS. 1, 2 and 3 are perspective views showing embodiments of film magazines of this invention.

The film magazine in accordance with this invention has a housing 5 with a cylindrical body portion 6 having an opening 4 in side 10 thereof for access to a film shaft 9. A slot 8 is provided in housing 5 for withdrawing the film. The magazine is provided with a disc-shaped projection 1 (FIG. 1) or fan-shaped projection 1′ (FIG. 2) on the side wall thereof concentric with opening 4 and thus the film sensitivity is indicated by variation of the difference between the outside radius R and projection radius $r$, that is $R-r$. An automatic exposure control means in a camera has a sensing means for sensing said difference $(R-r)$, such as a sensing lever movable in a direction of radius vector of the magazine body portion.

Figure 4:
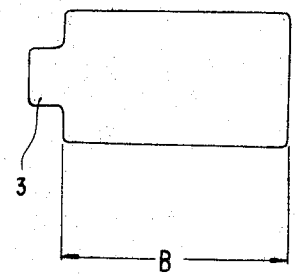
FIG. 4 shows an outline of a film magazine of the prior art standardized in ASA PH 1.14–1959.

As it is necessary that the film magazine of this invention can be used for the conventional still cameras, the body portion of the film magazine has a size standardized in ASA PH 1.14–1959 (see FIG. 4). Following these standards, the dimensional values $B_1$, $B_2$ (FIGS. 1 and 2) are set as follows:

$B_1 = 43.8$ mm.    $B_2 = 42.4$ mm.    $t = 1.4$ mm.

Figure 2:
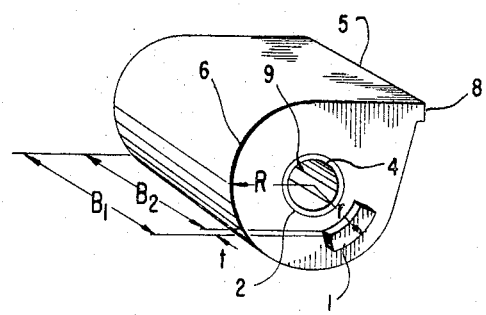

(FIGS. 1 and 2).

Figure 3:
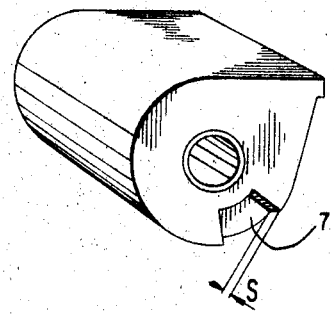

In the FIG. 3 embodiment, a recess 7 of a depth S is provided in the side wall and in this case the dimensional values may be set as follows:

$S \geq 1.4$ mm. and $B_1 = B_2 = 43.8$

The spool shaft of a conventional film magazine has a projecting portion 3 of several millimeters out of one side thereof, see FIG. 4, but according to this invention it is eliminated, that is to say, there is no shaft projection so that just the end face 2 of the spool shaft 9 is flush with the outside of the housing side 10. This film magazine may appear inconvenient for the conventional camera, but it has been confirmed as a result of experiments that even if there is no projection 3, no inconvenience occurs.

If the magazine is made of plastic, it will be easy and inexpensive to manufacture because the projection 1 or recess 7 will have little or no effect on the cost.

As first mentioned, the film magazine according to this invention can be used in the existing conventional 35 mm. camera and therefore there is no problem or inconvenience when the film magazines are sold even at the present time.

Figure 5:
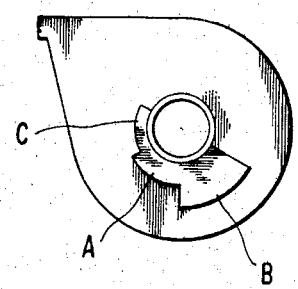
FIG. 5 is a side elevation view showing another embodiment of a film magazine of this invention.

As the film magazine of this invention has no projection 3, the corresponding accommodating dead space may be removed from the camera, so that the camera may be made in a smaller size. According to this invention, in the case of designing the camera having an exposure control means for both the conventional film magazine and that of this invention, it becomes possible to make the control means changeable from automatic to manual according to the film magazine loaded therein, utilizing the difference between presence and absence of the projected portion of the spool shaft. Moreover a circular arc type projection may be utilized for indicating the number of frames of film or the kind of film as well as the sensitivity. As shown in FIG. 5, arcuate projections A, B and C may be provided together for indicating film sensitivity, kind of film, such as daylight type or tungsten type and number of the frames of film, respectively.

Those skilled in the art will at once appreciate that variations and modifications may be made in the structure shown by way of illustration in the present specification without departing from the scope of the novel concepts thereof and it is, accordingly, our intention that the scope of the present invention be limited solely by that of the claims.

What is claimed is:
1. A film magazine for still cameras comprising: a magazine housing including a cylindrical body portion having a pair of side walls and a slot through which the film therein is withdrawn, the side walls each having an opening concentric with the cylindrical body for access to a spool shaft, the spool shaft being rotatably mounted completely within the housing and not projecting beyond the side walls, and an arcuate portion of one side wall concentric with the cylindrical body portion and spool shaft opening having an axial dimensional variation so that the distance from one side wall to the face of the arcuate portion is different from the axial dimension between the side walls, the arcuate portion being constructed and positioned such that the dimensional difference between the radius of the cylindrical body and the radius of the arcuate portion represents a predetermined characteristic of the film in the housing.

2. A film magazine as in claim 1 wherein the arcuate side wall portion has two areas of different radii representing separate characteristics of the film in the housing.

References Cited

UNITED STATES PATENTS

| | | | |
|---|---|---|---|
| 3,138,084 | 6/1964 | Harvey | 352—77 |
| 3,276,340 | 10/1966 | Nerwin | 95—31 |
| 3,404,613 | 10/1968 | MacGregor et al. | 95—31 |

NORTON ANSHER, Primary Examiner

D. S. STALLARD, Assistant Examiner

U.S. Cl. X.R.

352—78